Inventor
CURT FREDRIK ROSENBLAD

Patented May 23, 1944

2,349,792

UNITED STATES PATENT OFFICE 2,349,792

TUBE AND SHEET CONNECTION

Curt Fredrik Rosenblad, Stockholm, Sweden, assignor to Aktiebolaget Rosenblads Patenter, Stockholm, Sweden, a corporation of Sweden Application September 24, 1940, Serial No. 358,140
In Sweden August 16, 1939

4 Claims. (Cl. 285—111)

The invention relates generally to devices comprising a tube and sheet assembly, such as tubular heat exchange apparatus or the like, for instance, and aims primarily at providing a practical method of tube replacement applicable under certain conditions with regard to the nature of the tube and sheet connection, and it also contemplates peculiar means of tube and sheet connection specially designed to suit the same.

More particularly the invention is concerned with structures having the tube and sheet connection made according to that known type whereby the tube is received in a sleeve or the like and joined to the same by welding at the juxtaposed terminal edges of both while being inserted together with the sleeve through a corresponding opening in the sheet to which the sleeve is fixed by welding in such a position that the joined terminals of the tube and sleeve will be disposed at a distance from the adjacent side of the sheet.

According to the prior art tube replacement in this type of tube and sheet connection requires removal of the sleeve from the sheet and exchanging the sleeve for a new one and this is a very difficult and expensive task which cannot be effected without seriously damaging the sheet. Moreover, in the known constructions the sleeve is welded directly to either or both of the sheet surfaces proper and this may also cause considerable deformation of the sheet which renders the tube replacement still more difficult.

The invention has for its object to provide a method of tube replacement and means of tube and sheet connection for structures of the character referred to whereby above all the above mentioned drawbacks will be eliminated.

A further object of the invention is to provide a suitable tube and sheet connection of similar type for a compound sheet.

Still other objects of the invention will be apparent from the following specification.

With this in view the method of tube replacement according to the invention consists mainly in disintegrating the terminal joint between the tube and sleeve but leaving an end portion of the sleeve to project from the adjacent side of the sheet, as before removing the tube from the sleeve, fitting a replacement tube in the sleeve similarly as in the case of the original tube so as to cause the juxtaposed terminal edges of both to be longitudinally spaced in proper relationship, and welding the replacement tube to the sleeve at said terminal edges.

In practice the step of disintegrating the terminal joint between the tube and sleeve is suitably carried out by cutting off the joint proper while having the longest possible end portion of the sleeve to project from the sheet.

Further the terminal joint between the tube and the sleeve is preferably effected by means of fusion welding without using any additional material, be it in the case of the original or the replacement tube.

The method according to the invention requires of course that a sufficient marginal portion of the tube and sleeve is extending through the opening in the sheet so that after cutting off the terminal joint there will remain an ample end portion of the sleeve extending as before in order that this operation as well as the welding of the replacement tube to the sleeve may be performed without damaging the sheet. It is obvious that by dimensioning the projecting marginal portion of the tube and sleeve accordingly it is rendered possible to successively carry out any number of tube replacements in the manner described, and naturally this method is well applicable with any known tube and sheet connection of the type in question only it be adapted therefor in the respect mentioned.

Thus, the invention provides a most practical method of tube replacement which can be employed without doing any damage to the sheet while using one and the same sleeve.

For a better understanding of the type of tube and sheet connections in accordance with the invention, some embodiments thereof will be illustrated by way of example in the accompanying drawing in which Fig. 1 shows in axial section a connection substantially as known in the prior art but more specially designed in accordance with the invention.

Figure 1:
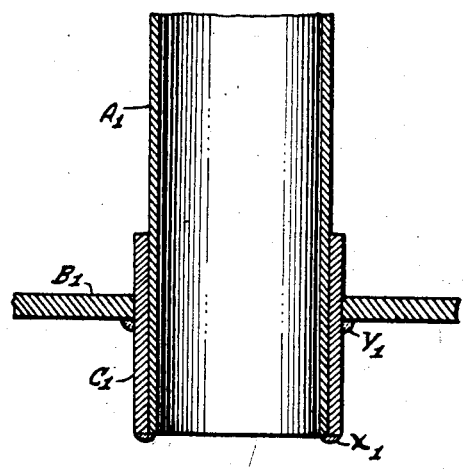

Referring now to the drawing in the connection shown by Fig. 1 the tube $A_1$ has an end portion inserted through a corresponding opening in the sheet $B_1$ while received in a sleeve $C_1$ fitted into the opening so that the juxtaposed terminal edges of both will be disposed at a distance from the adjacent side of the sheet, the tube being joined to the sleeve by welding at the terminal, as designated by $X_1$, and the sleeve being fixed to the sheet at either side thereof, as designated by $Y_1$.

According to the invention but in contrast to former practice it is thereby required that the marginal portion of the tube and sleeve which will thus be extending from the sheet at the side adjacent the terminal has a rather considerable length in order to suit the method of the replacement disclosed above. Then it will normally be the easiest thing to carry out the tube replacement by cutting off the terminal joint between the tube and sleeve at $X_1$ and so forth, but difficulties may still sometimes occur in case the sheet be deformed or the material be subjected to interior tension or stresses, as may be caused by the welding operation at the joint $Y_1$.

Figure 2:
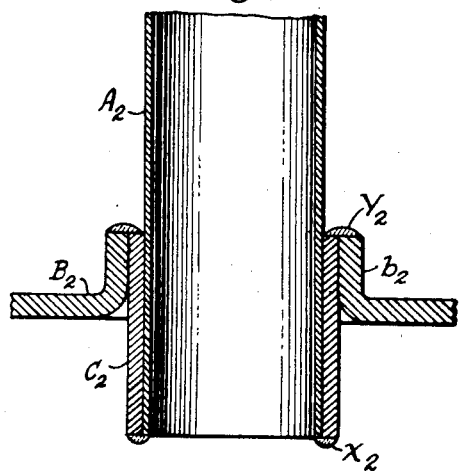
Fig. 2 shows in axial section a modification of a similar connection according to the invention.

However, the lastmentioned disadvantage is substantially eliminated in the connection shown by Fig. 2 which differs in that a portion of the sheet $B_2$ is formed to project from the sheet $B_2$ as a cuff $b_2$ around the opening in the sheet at the side opposite the terminal of the tube $A_1$ joined to the sleeve $C_2$ at $X_2$ while embracing an end portion of the sleeve $C_2$ extending at that side, the sleeve $C_2$ being secured to the cuff $b_2$ at the juxtaposed terminal edges of both, as indicated by $Y_2$. In this connection the tube $A_2$, the sleeve $C_2$ and the cuff $b_2$ are preferably spaced relative to each other in the longitudinal direction so that the juxtaposed terminal edges of the tube and sleeve and of the sleeve and cuff substantially coincide while the respective terminal joints $X_2$ and $y_2$ are effected by fusion welding without using any additional material.

Figure 3:
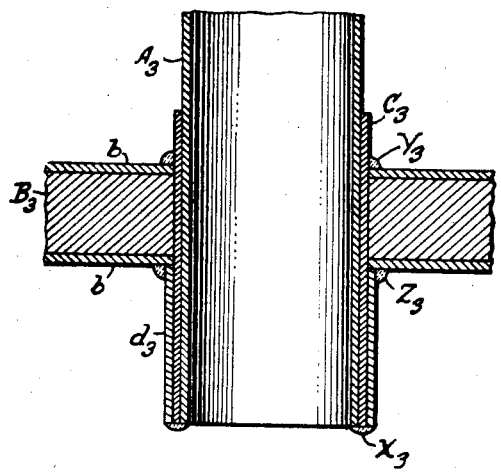
Figs. 3 and 4 show in axial section different embodiments of a connection for a compound sheet according to the invention.

Fig. 3 shows a connection for a compound sheet comprising a relatively thick body plate $B_3$ covered at each side by a relatively thin facial plate $b$. This connection is substantially similar to that shown in Fig. 1 but includes a separate cuff-like member $d_3$ provided to project from the sheet at the side adjacent the terminal of the tube $A_3$ around the opening in the sheet while embracing the end portion of the sleeve $C_3$ extending at that side. The member $d_3$ is secured to the facial plate at $z_3$ while the sleeve $C_3$ is secured on one side to said member $d_3$ at $X_3$ and on the other side to the facial plate located at the opposite side of the sheet, as indicated by $Y_3$. Thereby the joint between the tube and the sleeve coincides with the joint between the sleeve and the cuff-like member, as at $X_3$. By virtue of this arrangement the sleeve may be removed and replaced, should so be required, by disintegrating only two joints, namely at $X_3$ and $Y_3$, and thus less damage will be made to the sheet in the course of such operation than if the sleeve should be directly fixed to both sides of the sheet.

Figure 4:
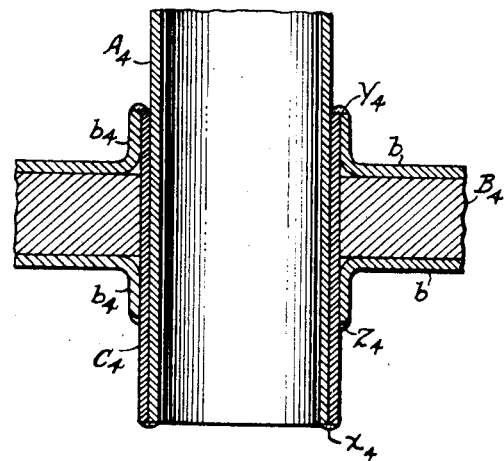

Fig. 4 shows another connection for a similar compound sheet $B_4$ with the body plate $B$ and the facial plates $b$, this connection having more resemblance to the one shown in Fig. 2. Thus, in this case each of the facial plates $b$ has a portion formed to a cuff $b_4$ projecting from the sheet around the opening therein, one at either side, while embracing a portion of the sleeve $c_4$ extending at the respective side. The sleeve is secured by welding to both these cuffs $b_4$, the cuff located at the side adjacent the terminal of the tube having the terminal united with the periphery of the sleeve, as at $z_4$, and the cuff located at the opposite side having the terminal united with the juxtaposed terminal of the sleeve as at $Y_4$, while $x_4$ indicates the joint between the tube and the sleeve. This arrangement serves to avoid welding direct at the sheet surfaces proper whereby the sheet might be damaged, as stated above. Preferably all joints are effected by fusion welding without using any additional material wherever this is possible, in this case as in all the others.

It is understood that further changes may be made in the connection means without deviating from the scope of the invention and that the invention is not limited otherwise than by the appending claims.

Thus, what I claim and desire to have secured by Letters Patent is:

1. In a tube and sheet connection for a sheet having an opening, a tube with an end portion thereof projecting through said opening, a sleeve fitted in said opening and received over said end portion of said tube so that the juxtaposed terminal edges of both are disposed at a distance from one side of the sheet, said tube and said sleeve being joined at said terminal edges by welding, said distance being sufficient so that said sleeve may be shortened repeatedly to permit the repeated removal and replacement of the tube, and a cuff consisting of a portion of the sheet projecting from the opposite side of the sheet from which the end portion of said tube projects, and extending around said opening while embracing an end portion of the sleeve extending at said opposite side, said sleeve being secured to said cuff by welding at the juxtaposed terminal edges of both.

2. In a tube and sheet connection for a compound sheet comprising a relatively thick body plate covered at each side by a relatively thin facial plate of different material than the body plate and having an opening through the whole, a tube with an end portion thereof inserted through said opening, a sleeve fitted in said opening and received over said end portion of said tube so that the juxtaposed terminal edges of both are disposed at a distance from one side of the sheet, said tube and said sleeve being joined by welding at said terminal edges, said distance being sufficient so that said sleeve may be shortened repeatedly to permit the repeated removal and replacement of the tube, and a cuff consisting of a portion of the facial plate located at the opposite side of the sheet, said cuff projecting from said opposite side around said opening and embracing an end portion of said sleeve extending at said opposite side, said sleeve being secured by welding to said cuff at the juxtaposed terminal edges of both and to the facial plate located at said one side of the sheet.

3. In a tube and sheet connection for a compound sheet comprising a relatively thick body plate covered at each side by a relatively thin facial plate of different material from the body plate and having an opening through the whole, a tube with an end portion thereof inserted through said opening, a sleeve fitted in said opening and received over said end portion of said tube so that the juxtaposed terminal edges of both are disposed at a distance from one side of the sheet, said tube and said sleeve being joined by welding at said terminal edges, said distance being sufficient so that said sleeve may be shortened repeatedly to permit the repeated removal and replacement of the tube, a separate cuff-like member provided at said one side of the sheet so as to project from that side around said opening and embracing the end portion of said sleeve extending at the same side, said member being fixed by welding to the facial plate located at said one side of the sheet, and said sleeve being secured by welding both to said member and to the facial plate located at the opposite side of the sheet.

4. In a tube and sheet connection for a compound sheet comprising a relatively thick body plate covered at each side by a relatively thin facial plate of different material than the body plate and having an opening through the whole, a tube with an end portion thereof inserted through said opening, a sleeve fitted in said opening and surrounding said end portion of said tube so that the juxtaposed terminal edges of the tube and sleeve are disposed at a distance from one side of the sheet, said tube and said sleeve being joined by fusion welding at said terminal edges, said distance being sufficient so that said sleeve may be shortened repeatedly to permit the repeated removal and replacement of the tube, and a cuff consisting of a portion of the facial plate located at the opposite side of the sheet, said cuff projecting from said opposite side around said opening and surrounding an end portion of said sleeve extending at said opposite side, said sleeve being secured by fusion welding to said cuff at the juxtaposed terminal edges thereof, and being secured by welding to the facial plate located at said one side of the compound sheet, there being no additional material used in effecting either of the fusion welds.

CURT FREDRIK ROSENBLAD.